Patented Jan. 2, 1940

2,185,181

UNITED STATES PATENT OFFICE 2,185,181

PRINTING INK AND METHOD OF MAKING SAME

Ruwin Bronsztajn, Hackensack, N. J.

No Drawing. Application January 26, 1934, Serial No. 708,476

10 Claims. (Cl. 134—35)

The present invention relates to the production of a preparation suitable for use in textile printing and in particular to a preparation which presents in convenient form all of the basic ingredients contained in a textile ink.

At the present time it is the general practice in the art of textile printing to grind together the pigment, such as zinc oxide and ultramarine, and a gum, such as gum tragacanth, gum arabic, British gum, etc., with water in a colloid mill. The albumin such as egg or blood albumin is then dissolved in the colloidal mixture, or the albumin is dissolved separately in water and the solution then mixed with the colloidal suspension of the pigment and gum. The mixture is then filtered through cloth, generally again ground together in a colloidal mill and then again filtered through cloth. The colloidal suspension is then employed in the printing machine for printing silks and other fabrics. This procedure is not only troublesome and laborious and requires that every textile printing establishment be equipped with a colloid mill for the purpose of preparing the inks, but the results obtained are not always uniform, particularly as it is not practical to prepare large quantities at a time, since the albumin solution will not keep for more than several days before becoming subject to the action of putrefactive bacteria.

I have found that a colloidal suspension of a pigment, a gum and a solution of albumin can be converted into the dry powdered form and yet retain its colloidal properties and heat coagulability if suitably treated, the mixture being in such a fine state of division that it quickly forms a colloidal suspension upon the addition of water. In such dry condition the albumin will keep indefinitely, so that a product of uniform composition is available for use over long periods of time.

According to the present invention, I grind zinc oxide or other pigment, with or without ultramarine, to the colloidal condition in any suitable colloid mill of known construction either with or without the albumin or other heat-coagulable protein solution. The gum may be dispersed with the zinc oxide or with the protein solution, or may be added later in the dry form. After the pigment, with or without the gum, has been brought to the state of more or less stable suspension in a volatile suspending medium, preferably water, it is mixed with the albumin solution if such solution was not present during the grinding of the pigment, and the mixture may then be filtered. The colloidal mixture is then dried in such a manner, at temperatures below the heat-coagulation point of the albumin, that the dry particles retain their colloidal properties, in particular they remain in an exceedingly fine state of subdivision and readily dissolve or become colloidally suspended in water. A satisfactory mode of drying the colloidal suspension is by means of the well-known spray drier, wherein a suspension is directed in finely atomized condition into a current of warm air. The drying should preferably be done very rapidly in order to prevent re-agglomeration of the individual particles. The dry product so obtained represents a uniform and homogeneous mixture which will form a uniform colloidal suspension upon simple mixing with water.

As different textile printers prefer different proportions of gums in relation to the quantity of pigment and albumin, my improved preparation may be made to embody the minimum amount of gum called for by printers, each printer then adding subsequently any further amount of gum that he may desire, the solution of such gum presenting no difficulties whatever.

It will thus be seen that I have provided a prepared mixture of pigment, gum and albumin which can be sold to the individual printers ready for immediate use and not requiring grinding in a mill, nor the time-consuming dissolving of the albumen by the printer as heretofore, while loss of materials resulting from repeated preparation of small quantities is avoided.

In a further development of the invention I employ, in place of the known egg or blood albumin, a heat-coagulable mixture of soluble thermally non-coagulable proteins and albumin, as described in my copending application Ser. No. 706,838, filed Jan. 16, 1934. Thus the more or less pure albumin heretofore employed may be replaced by a mixture of thermally non-coagulable vegetable proteins with such a quantity of albumin, preferably animal albumin, that the albumin comprises at least 3% of the total protein content. For most purposes the albumin should comprise at least 10% of the total proteins, 20 to 30% being the preferred range, although larger quantities, as 50% or more, may be employed. In certain instances I may employ materials containing other substances in addition to the proteins, such as a protein-containing vegetable concentrate obtained from vegetable materials including beans, seeds, nuts or other protein-containing substances by first removing the shells and oil in either order from such vegetable materials. Such concentrates may be made heat-coagulable by the addition of a suitable quantity of albumin. It is generally desirable to leave a part, such as 1 to 5% or more by weight of the vegetable material, of the vegetable oil in the vegetable concentrate to reduce or eliminate foaming.

I claim:

1. A composition of matter for use in the preparation of printing compositions, comprising a powdered mixture containing a pigment, a hydrophilic gum, and a mixture of thermally non-coagulable, soluble vegetable protein and such quantity of uncoagulated albumin as will be capable of rendering the whole mixture heat coagulable.

2. The method of producing a printing composition capable of forming a heat-coagulable colloidal paste with water, which comprises grinding a pigment to colloidal fineness, mixing the pigment with water and with a hydrophilic gum and with a heat-coagulable mixture of thermally non-coagulable proteins and albumin, the proportion of albumin being such that the whole composition can be set by heat, and then spraying the mixture in finely atomized condition into a current of warm air to dry the same rapidly at temperatures below the coagulation point of the albumin, whereby a solid, uniform composition containing the albumin in a heat-sensitive state is obtained.

3. The method of producing a printing composition capable of forming a heat-coagulable colloidal paste with water, which comprises grinding a pigment to colloidal fineness with water, mixing the suspension with a hydrophilic gum and with a hreat-coagulable mixture of an albumin and a vegetable material containing a thermally non-coagulable protein, the proportion of albumin being such that the whole composition can be set by heat, and then drying the mixture at temperatures below the coagulation point of the albumin, whereby a solid, uniform composition containing the albumin in a heat-sensitive state is obtained.

4. The method of producing a printing composition capable of forming a heat-coagulable colloidal paste with water, which comprises grinding a pigment to colloidal fineness with water, mixing the suspension with a hydrophilic gum and with a heat-coagulable mixture of an albumin and a thermally non-coagulable protein-containing vegetable concentrate, the proportion of albumin being such that the whole composition can be set by heat, and then drying the mixture at temperatures below the coagulation point of the albumin, where a solid, uniform composition containing the albumin in a heat-sensitive state is obtained.

5. The method of producing a printing composition capable of forming a heat-coagulable colloidal paste with water, which comprises grinding zinc oxide and ultramarine to colloidal fineness with water, mixing the suspension with a hydrophilic gum and with a heat-coagulable mixture of an albumin and a thermally non-coagulable protein-containing vegetable material, the proportion of albumin being such that the whole composition can be set by heat, and then drying the mixture quickly to preserve its colloidal subdivision at temperatures below the coagulation point of the albumin, whereby a solid, uniform composition containing the albumin in a heat-sensitive state is obtained.

6. A composition of matter for use in the preparation of printing compositions comprising a powdered mixture resulting from the low temperature drying of a liquid suspension of a pigment and a mixture of a thermally non-coagulable vegetable protein material and albumin, the latter being in such proportion that the composition is coagulable by heat, said mixture being in a state of such fine sub-division that the same is converted into a colloidal suspension upon agitation with water.

7. A composition of matter for use in the preparation of printing compositions, comprising the solid product obtained by drying an intimate mixture, in water, of a pigment, a hydrophilic gum, and a heat-coagulable protein material at a temperature below the coagulation point of the protein material, the latter being present in such proportion as to make the whole mixture heat-coagulable, said mixture being in such a state of fine sub-division that it is converted into a colloidal suspension upon mixing with water.

8. A composition of matter for use in the preparation of printing compositions, comprising the solid product obtained by drying a mixture, in water, of a pigment, a hydrophilic gum, and a soluble, heat-coagulable protein material containing vegetable protein and about 10 to 30% of albumin, at a temperature below the coagulation point of the protein material.

9. A composition of matter for use in the preparation of printing compositions, comprising the solid product obtained by drying a mixture, in water, of a pigment, a hydrophilic gum, and a soluble heat-coagulable protein material containing vegetable protein and about 3 to 50% of albumin, at a temperature below the coagulated point of the protein material.

10. The method of producing a printing composition capable of forming a heat-coagulable colloidal paste with water, which comprises grinding a pigment to colloidal fineness with water, mixing the suspension with a hydrophilic gum and with a heat-coagulable protein material, and then quickly drying the mixture at temperatures below the coagulation point of the protein material, whereby a solid, uniform composition containing the protein material in a heat-sensitive state is obtained, the proportion of protein material being such as to render the whole mixture coagulable by heat after mixing with water.

RUWIN BRONSZTAJN.